No. 853,299. PATENTED MAY 14, 1907.
P. EBNER.
WHEEL RIM AND TIRE.
APPLICATION FILED JUNE 6, 1906.
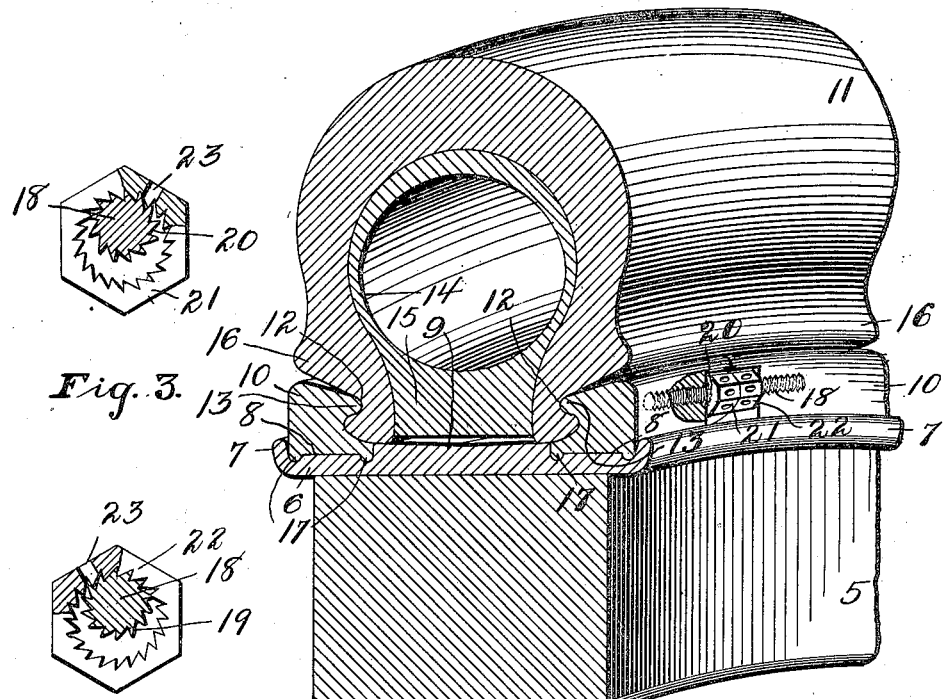
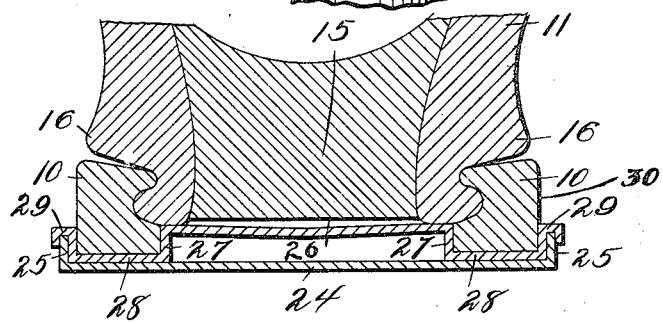
Inventor
Peter Ebner.
Witnesses
Carl Stoughton
F. G. Campbell
By Shepherd & Parker
Attorneys

UNITED STATES PATENT OFFICE.

PETER EBNER, OF COLUMBUS, OHIO.

WHEEL RIM AND TIRE.

No. 853,299.          Specification of Letters Patent.          Patented May 14, 1907.

Application filed June 6, 1906. Serial No. 320,379.

To all whom it may concern:

Be it known that I, PETER EBNER, a citizen of the United States, residing at Columbus, in the county of Franklin and State of Ohio, have invented certain new and useful Improvements in Wheel Rims and Tires, of which the following is a specification.

My invention relates to a wheel rim and tire and has for its object the provision of an improved rim and means for securing a tire to said rim.

A further object of the invention is the provision of a rim and means for supporting the tire when there is a tendency for the wheel to skid.

Further objects and advantages of the invention will be set forth in the detailed description which now follows:

In the accompanying drawing: Figure 1 is a sectional perspective view of a wheel rim and tire constructed in accordance with the invention, Fig. 2 is a transverse vertical section of a modified form of rim, Fig. 3 is a detail view of a toothed turn-buckle and ratchet nut, the teeth of the ratchet nut being adapted to turn said turn-buckle in one direction, and, Fig. 4 is a detail view of said turn-buckle illustrating a ratchet nut adapted to turn said turn-buckle in the opposite direction.

Like numerals designate corresponding parts in all of the figures of the drawing.

Referring to the drawing, the numeral 5 designates the felly of the wheel. Secured to this felly in any desired manner, is a rim 6 having upturned flanges 7 at each side thereof. Bead receiving grooves or depressions 8 lie upon each side of a central elevated portion 9 of the rim, said depressions being adapted to receive retaining beads 10. A tire 11 has grooves 12 extending around the same adapted to be engaged by lips 13 which are carried by the beads 10. An inner tube 14 has a solid depending portion 15 which lies between the side walls of the tire proper and holds said tire in such position that the lips 13 firmly engage in the grooves 12. The body portion of the tire 11 is thickened to form overhanging shoulders 16 and the upper surfaces of the beads 10 are inclined and flattened to form a bearing surface for these shoulders 16 when the vehicle to which the tire is secured, is turning a curve. It will be understood that when the vehicle turns a curve at a high rate of speed, there is a tendency for the wheels to skid or to move laterally with relation to the tire. This of course bends the tire over and sometimes forces it out of engagement with the rim. Much of the strain between the clenching portions of the tire is relieved by the provision of these shoulders and the bearing surfaces therefor for the upper surfaces of these beads are plane as are the under sides of the shoulders, these beads therefore forming a firmer and better support for the shoulders than would be the case if the upper surfaces of the beads were rounded, for if the upper surfaces of these beads were rounded, the shoulders would roll or bend over them instead of resting upon them.

The beads 10 have depending ribs 17 formed thereon which lie in recesses formed in the rim, though these ribs may be omitted if desired. A turn-buckle 18 has right and left hand threads formed upon its opposite ends and is adapted to draw the two ends of the bead together, it being of course understood that there is a like turn-buckle located upon the opposite side of the wheel. Intermediate its ends this turn-buckle has oppositely inclined ratchet teeth 19 and 20 formed thereon. A ratchet nut 21 is adapted to engage the ratchet teeth 20, while a ratchet nut 22 is adapted to engage the ratchet teeth 19. The openings in the ratchet nuts are of sufficiently greater size than the diameter of the turn-buckle to permit said nuts to turn in one direction without actuating the turn-buckle, but when said nuts are given a forward movement, the teeth thereof engage with the teeth of the turn-buckle to turn the same. By virtue of this construction, when a pin is inserted in openings 23 formed in the ratchet nuts, said ratchet nuts may be moved backward and forward to actuate the turn-buckle without removing the pin from the opening 23.

In the modified form of rim shown in Fig. 2, the general characteristics of the rim are the same. It is designed, however, to form a rim of this character of sheet metal and when this is done the rim comprises a base portion 24 having upturned side flanges 25. A central raised portion 26 terminates in vertical walls as at 27, said walls in turn being continued to form horizontal portions 28. Turned-over portions 29 extending from these walls 28 are bent about the flanges 25 and complete a sheet metal rim.

If desired, the beads 10 may be turned around in such manner that their outer vertical walls 30 lie against the tire, in which case a tire constructed in such manner as to conform to said vertical wall will be used.

By providing the depressions 8 having the plane base portions, a firm support for the beads 10 is provided, which resists any tendency of said beads to tilt or turn under the pressure exerted by the tire when the wheel is in use.

From the foregoing description, it will be seen that simple and efficient means are herein provided for accomplishing the objects of the invention, but while the elements shown and described are well adapted to serve the purposes for which they are intended, it is to be understood, that the invention is not limited to the precise construction set forth, but includes within its purview such changes as may be made within the scope of the appended claims.

What I claim, is:

1. In a device of the character described, the combination with a clencher body, of a turn-buckle adapted to draw the ends of said clencher body together, oppositely disposed ratchet teeth formed upon said turn-buckle, and ratchet nuts having oppositely disposed teeth adapted to engage the teeth of the turn-buckle to actuate the same in either direction.

2. In a device of the character described, the combination with an annular rim, of a removable annular bead adapted to engage said rim, a tire having an overhanging shoulder adapted to rest upon said bead, the upper face of said bead being inclined, and the upper face of the bead and the lower face of the shoulder, being flat and presenting plane surfaces to each other.

3. In a device of the character described, the combination with an annular rim, of a removable annular bead adapted to engage said rim, a tire having an overhanging shoulder adapted to rest upon said bead, the upper face of said bead being inclined and sloping downwardly toward the center of the tire, both the upper face of the bead and the lower face of the shoulder, being flat and presenting plane surfaces to each other.

In testimony whereof I affix my signature in presence of two witnesses.

PETER EBNER.

Witnesses:
FRANK G. CAMPBELL,
A. L. PHELPS.